United States Patent Office 3,259,599
Patented July 5, 1966

3,259,599
NON-PRESS CURING OF POLYETHER TYPE POLYURETHANES WITH BUTADIENE ACRYLONITRILE COPOLYMER
William R. Walker, Seattle, Wash., assignor to Boeing Airplane Company, Seattle, Wash., a corporation of Delaware
No Drawing. Filed July 31, 1961, Ser. No. 127,818
8 Claims. (Cl. 260—23.7)

This invention relates to the preparation of polyurethane elastomer formulations and, more particularly, to the processing of these formulations, and is a continuation-in-part of my copending application Serial No. 778,579, filing date of December 8, 1958 now abandoned.

The reaction products of polyalkylene ether glycols and diisocyanates, polyalkylene ether glycol-diisocyanate elastomers, are extensively used throughout the aircraft and missile field as this reaction product possesses many desirable physical and chemical characteristics. More particularly, it is especially resistant to ozone. When subjected to an atmosphere comprising a relatively high concentration of ozone it does not crack or become brittle. Another desirable property is that it possesses extremely good low temperature flexibility. In this regard it does not crack or become brittle until temperatures below about minus 95° F. (—95° F.) are reached. Also, it has desirable heat resistant characteristics up to approximately 250° F. In regard to its use in the aircraft and missile fields it has good resistance to softening and deterioration when subjected to jet fuels such as JP–4, petroleum based hydraulic fluid and the like. The fuel JP–4 is a low-vapor pressure type (NATO description: wide-cut gasoline type). In fact, it is possible to immerse a molded part in jet fuel (mainly kerosene), dry the part, immerse it again, dry the part, and then to repeat this process numerous times, expose the part to ozone and subject it to stress without the part cracking. It is not possible to state this for other materials known at the present time having other properties similar to the polyalkylene ether glycol-diisocyanate elastomer. Furthermore, this elastomer possesses fine abrasion resistance. In this regard it may be used for chute lining in the transportation of abrasive materials, industrial, passenger and truck tires, and shock absorption gears and the like. Another desirable characteristic is that when it is cured with sulfur the cured product possesses superior tensile strength and tear resistance, and elongation characteristics. Furthermore, when cured with the dicumyl peroxide curing system the material possesses desirable compression set characteristics.

The desirable properties above enumerated for the polyalkylene ether glycol-diisocyanate elastomer were restricted to molded parts and, prior to my invention, were not achievable with extruded parts. As is well known to those versed in the mechanical arts a molded item, because of economic reasons, is normally of restricted size and shape as contrasted with an extruded part which may be of an indefinite length. It is possible to mold a part of extremely large size and complicated configuration but the expense involved is usually prohibitive. Examples of molded items are O-rings, tires and sundry items. These are not made in long indefinite lengths of a definite configuration as an extruded part may be made.

In an attempt to cure an extruded item I prepared formulations comprising the polyurethane elastomer and extruded the same into numerous parts. I placed a part in an atmosphere of steam in an autoclave at a temperature in the range of approximately 310–325° F. for 30–40 minutes. Also, I placed a part in an atmosphere of air at a temperature in the range of about 310–325° F. for approximately 30–40 minutes. The inner core of the extruded part cured but the surface layer did not cure. More particularly, the surface to a depth of approximately 0.01 of an inch did not cure. This was evidenced by placing the part in a fuel comprising on a volume basis approximately thirty (30%) percent isoctane and seventy (70%) percent toluene. Upon standing for approximately a week the fuel dissolved the surface layer to a depth of approximately 0.01 inch and became discolored. Also, the surfaces of the parts became gummy and gooey.

Such an extruded item can definitely not be used inside of a fuel tank as the surface layer would dissolve in the fuel and cause malfunction of valves, nozzles, etc. Also, in storage the extruded item could not be stored without a protective surface or wrapping as the item would stick to itself or other extruded items. Furthermore, it is messy in appearance and also undesirable in handling as it would adhere to foreign matter. Of a more serious nature is the fact that the dimensions of the item could change due to being dissolved. Many of these polyurethane parts are made to a tolerance of 0.01 inch or less. Another undesirable feature of such an extruded item is the definite possibility of not realizing a good seal so as to have a probable leak with possible undesirable results.

With this background of information I have accordingly invented a process for the curing of extruded formulated polyurethane elastomers known in commercial usage as Adiprene C, a product of E. I. du Pont de Nemours and Co. (Inc.), of Wilmington, Delaware.

Another object is the provision of a process for the curing of extruded polyurethane elastomers and which extrusions are resistant to fuel and petroleum base materials.

A still further object is the provision of a process for the curing of polyurethane elastomers and which process increases the possibility of the cured elastomer realizing a definite seal with associated parts and mechanisms.

Another object is the provision of a process for the curing of extruded polyurethane elastomers and which process is inexpensive to perform, and can be realized with conventional equipment.

Turning now to a specific disclosure of my invention the same is directed to the curing of the polyurethane elastomers, known as Adiprene C in a fluid atmosphere devoid of free oxygen or of oxygen in combined form. More particularly, the polyurethane elastomer is formulated in a manner well known to the art to make a composition of matter. This composition of matter is then cured under conditions making it possible to cure the surface as well as the core of the extruded item.

Adiprene is a trademark of novel polyurethane elastomers, and more particularly to polyurethane elastomers having side chains containing aliphatic

groups, which may be cured by sulfur.

The novel polymeric polyurethane elastomers consist essentially of the recurring structural units

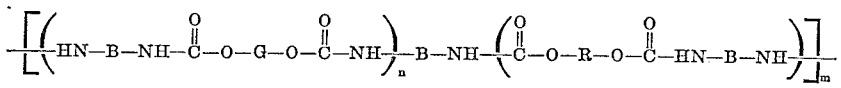

wherein O—G—O is a bivalent radical resulting from removal of the terminal hydrogen atoms from a polymeric glycol having a molecular weight of at least 750 and being selected from the group consisting of polyalkyleneether glycols, polyalkyleneether-thioether glycols, polyalkylene-aryleneether glycols, and polyalkylene-aryleneether-thioether glycols; B is a bivalent organic radical, said radical being inert to isocyanate groups; O—R—O is a bivalent radical resulting from removal of the terminal hydrogen atoms from a nonpolymeric glycol; n is an integer greater than zero; m is an integer including zero; each of the structural units being connected to the next by a radical selected from the group consisting of

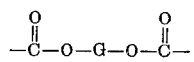

and

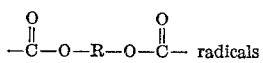 radicals wherein O—G—O and O—R—O have the significance defined above; with at least 60% of the total weight of the polymer being the bivalent radicals O—G—O; with the proviso that at least one of the bivalent O—G—O, B and O—R—O radicals have a side chain containing an aliphatic

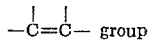 group with the remaining valences on the carbon atoms of said group being satisfied by monovalent substituents, said side chain occurring at least once for every 8000 units of molecular weight of said polymeric polyurethane.

The polymeric polyurethanes of Adiprene C may be conveniently prepared by several general procedures. Thus, a polymeric glycol, such as a polyalkyleneether glycol, an organic diisocyanate and a low molecular weight non-polymeric glycol, with the ratio of the diisocyanate to the sum of the polymeric and nonpolymeric glycols being substantially equimolar may be reacted together to prepare polymers within the scope of the present invention. The polymeric glycol may be reacted first with a molar excess of the organic diisocyanate so as to form an isocyanate-terminated polymer and this reaction may then be followed by a chain extension step with the low molecular weight, non-polymeric glycol. Another method which may be used is to first react the low molecular weight, non-polymeric glycol with a molar excess of an organic diisocyanate and then react the resulting isocyanate-terminated product with the polymeric glycol. It is to be understood that in following these procedures, the polymeric glycol, organic diisocyanate and low molecular weight, non-polymeric glycol need not necessarily be the same in each instance in the preparation of any given polymer. The polymeric polyurethanes have side chains which contain aliphatic

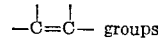 groups

These side chains may be present on any one of the reactants which are used. The side chains serve as potential curing sites and the polymer may, therefore, be conveniently cured by application of a sulfur curing procedure. It is also possible to prepare polymers within the scope of the Adiprene C by reacting a polymeric glycol with a substantially equimolar proportion of an organic diisocyanate with the side chain containing the aliphatic

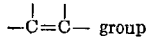 group on either one or both of these reactants. Another method which may be used is to react a mixture of two or more different polymeric glycols, such as a polyalkyleneether glycol and a polyalkyleneether-thioether glycol, with the organic diisocyanate, followed by the reaction with a low molecular weight, non-polymeric glycol, or to react one of the polymeric glycols with the organic diisocyanate, so as to prepare an isocyanate-terminated polymer, followed by the reaction with a different polymeric glycol. Here again any one or all of these reactants may have the side chain which contains the aliphatic

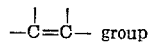 group

In a similar manner the bis-chloroformates of the polymeric glycol and of the non-polymeric glycol may be prepared and these then may be reacted with a substantially equimolar amount of an organic diamine having the side chain which contains an aliphatic

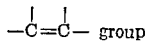 group present on either the bis-chloroformates or the diamine reactant. It is quite obvious that various modifications of any of the processes may be made in order to prepare the polymeric polyurethanes.

When preparing the polymers of Adiprene C by the reaction of glycols with diisocyanates, various high molecular weight, polymeric glycols, such as polyalkylene-reaction of glycols with diisocyanates, various high molecular weight, polymeric glycols, such as polyalkyleneether-thioether glycols, may be used. These polymeric glycols should have molecular weights of at least 750; however, they may be as high as about 10,000. In general, molecular weights of 750 to 5000 are preferred. It is to be understood that any of these polymeric glycols may have side chains containing aliphatic

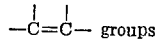 groups and when they do, the molecular weights will be increased in accordance with the molecular weights of the side chain groups.

In general, the polyalkyleneether glycols are preferred. These compounds may be represented by the formula $HO(GO)_nH$, wherein G is an alkylene radical and n is an integer sufficiently large that the polyalkyleneether glycol has a molecular weight of at least 750. Not all of the alkylene radicals present need be the same. These compounds are ordinarily derived by the polymerization of cyclic ethers such as alkyleneoxides or dioxolane or by the condensation of glycols. The preferred polyalkyleneether glycol is polytetramethyleneether glycol, also known as polybutyleneether glycol. Polyethyleneether glycol, polypropyleneether glycol, 1,2-polydimethylalkyleneether glycol is polytetramethyleneether glycol, are other typical representatives of this class. Polyalkyleneether glycols having side chains which contain aliphatic C=C groups may be prepared by copolymerizing tetrahydrofuran with butadiene monoxide, as more particularly described in German Patent No. 914,438.

The polyalkyleneether-thioether glycols may be represented by the formula $HO(QY)_nH$, wherein Q represents hydrocarbon radicals at least some of which are alkylene, Y represents chalcogen atoms some of which are sulfur and the rest oxygen, and n is an integer sufficiently large so that the glycol has a molecular weight of at least 750.

These glycols may be conveniently prepared by condensing together various glycols and thiodiglycol in the presence of a catalyst such as p-toluene sulfonic acid.

The polyalkylene-aryleneether glycols are similar to the polyalkyleneether glycols except that some arylene radicals are present. Part of the ether oxygens may be replaced with sulfur. In general, the phenylene and naphthylene radicals may be used with or without substituents such as alkyl or alkylene groups.

Any of a wide variety of organic diisocyanates may be employed to react with the glycols, including aromatic, aliphatic and cycloaliphatic diisocyanates and combinations of these types. It is to be understood that mixtures of two or more organic diisocyanates may be used. Representative compounds include toluene-2,4-diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4-4'-methylene-bis-(cyclohexyl isocyanate) and 1,5-tetrahydronaphthylene diisocyanate. Arylene diisocyanates, i.e., those in which each of the two isocyanate groups is attached directly to an aromatic ring, may be used. Compounds such as toluene-2,4-diisocyanate in which the two isocyanate groups differ in reactivity are particularly desirable. The diisocyanates may contain other substituents, although those which are free from reactive groups other than the two isocyanate groups are ordinarily preferred. As mentioned above, the organic diisocyanates may have side chains containing aliphatic

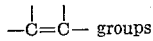 groups and aromatic diisocyanates with these side chains may be prepared by the process described in U.S.P. 2,647,884 by starting with diamines such as 4-allyloxy-m-phenylene diamine instead of a monoamine. In the case of the aromatic compounds the isocyanate groups may be attached either to the same or to different rings. In the above recited general formula, the radicals which are derived from the organic diisocyanates have been represented by the letter B, and B is defined as being a bivalent organic radical which is inert to isocyanate groups. This limitation has been imposed on this bivalent radical since it is obvious that this radical may not contain groups which are reactive with isocyanate groups.

When the polymeric polyurethanes of Adiprene C are prepared by reacting substantially equimolar amounts of one or more polymeric glycols with one or more organic diisocyanates, the polymer will be essentially characterized by the recurring structural units.

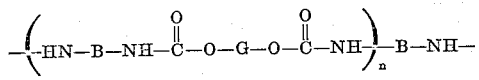

wherein O—G—O, B and $n$ have the significance defined above; with each of the structural units being connected to the next by a radical

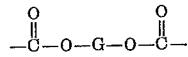

with the side chains containing an aliphatic

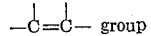 group being present on either one or both of the B or O—G—O radicals. It is readily apparent that if an organic diisocyanate such as 4-allyloxy-m-phenylene diisocyanate is used, a side chain allyloxy group will be present on the B radical; whereas if the polymeric glycol reactant has a side chain containing an aliphatic

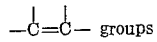 groups this side chain will be present on the O—G—O radical. It is also apparent that if mixtures of two or more different polymeric glycol reactants are used, the O—G—O radicals will not be the same in each recurring structural unit.

When preparing these polymers by the reaction of polymeric glycols with organic diisocyanates, it is to be understood that other low molecular weight, non-polymeric glycols may be present. These reactants should have molecular weights below about 200 and they may have the side chains containing the aliphatic

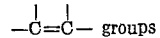 groups

In general, any low molecular weight, non-polymeric glycol may be used and these glycols may be entirely aliphatic, or may contain aromatic or cycloaliphatic constituents. Representative non-polymeric glycols having side chains containing aliphatic

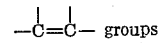 groups include 4-methyl-3-cyclohexene-1, 1-dimethanol; 3-cyclohexene-1, 1-dimethanol; 3-allyloxy-1, 5-pentanediol; 3-(allyloxy) - 1, 2 - propanediol; 2-[(allyloxy)-methyl]-2-methyl-1, 3-propanediol, 2-vinyl-1, 3-propanediol; 3-(2-methylallyloxy)-1, 2-propanediol; 2,2'-(4-allyl-m-phenylenedioxy)-diethanol; 3-(o-allylphenoxy)-1, 2 - propanediol; 2-[(allyloxy)ethyl]-1, 3-propanediol; 2-methyl-2-[(4 - pentenyloxy)methyl]-1, 3-propanediol; 2-[(allyloxy)ethyl]-2-methyl-1, 3-propanediol; 2-methyl-2-[(10-undecenyloxy) - methyl]-1, 3-propanediol; 2,2'-(allylimino)-diethanol; 2-[(3-methylallyloxy)methyl]-2-methyl-1, 3-propanediol; 2-[(allyloxy)methyl]-1, 3-propanediol; 3-(o-propenylphenoxy) - 1, 2 - propanediol; 3 - (p-propenylphenoxy)-1, 2-propanediol; and 3-(4-allyl-2-methoxyphenoxy)-1, 2-propanediol: For purposes of the present invention, the 1,3-propanediols of the formula

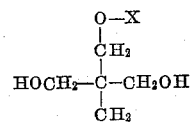

wherein X is a hydrocarbon radical bearing a terminal aliphatic —CH=CH$_2$ group, are of particular value.

When a low molecular weight, non-polymeric glycol reactant is used to prepare the polymeric polyurethanes several procedures may be used. One of these involves the reaction of a molar excess of organic diisocyanate with the non-polymeric glycol so as to provide an isocyanate-terminated product. This product is then reacted with the polymeric glycol reactant. Another procedure is to react the polymeric glycol with a molar excess of the organic diisocyanate so as to provide an isocyanate-terminated polymer. The non-polymeric glycol is then used to chain extend this isocyanate-terminated polymer and to react with any free organic diisocyanate which may be present. It is readily apparent that in any of these procedures, urethane groups are formed by reaction of the terminal hydroxyl groups of the glycol with the terminal isocyanate groups of the organic diisocyanate.

When reacting the glycols, i.e., both the polymeric and the non-polymeric, with the organic diisocyanate, the reactants may be mixed together in substantially equimolar proportions of hydroxyl to isocyanate groups, in any suitable mixing equipment, at a temperature of from about 70 to 120° C. until substantially all of the isocyanate groups have reacted with the hydroxyl groups of the glycol. It is to be understood that the reaction will go faster at higher temperatures and the reaction can be speeded up by using a tertiary amine catalyst. It is desirable to use substantially equimolar proportions since an appreciable amount of free isocyanate groups after the reaction should be avoided as they will tend to react with the moisture in the air or react with active hydrogen atoms in the polymeric polyurethane and may cause premature gelation. It is necessary that the reaction be carried out under substantially anhydrous conditions and that the glycol reactants contain less than about 0.05 percent of water. This limitation is imposed because of the fact that with more water present, there will probably be urea groups formed by the reaction of the diisocyanate with the water and this will result in a gradual decrease in the thermal stability of the polymer. The product at this stage of the reaction is a substantially linear polymeric product in the form of a somewhat plastoelastic homogeneous solid. Substantially all of the isocyanate groups have been used up by reaction with the hydroxyl groups of the glycols. Since the product has side chains containing aliphatic

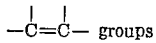 groups said side chains having been introduced by any one of the reactants, the product may be conveniently cured by using a sulfur curing procedure.

As mentioned above, the polymers of Adiprene C may also be prepared by reacting the bis-chloroformate of the polymeric glycol with an organic diamine and optionally with a bis-chloroformate of a low molecular weight, non-polymeric glycol. The side chains containing the aliphatic

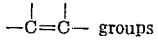 groups may be present on any one or more of these reactants. The bis-chloroformates of the polymeric glycols may be represented by the formula, Cl—COO—G—OOC—Cl, wherein G is a bivalent organic radical having a molecular weight of at least 716. These compounds may be prepared by using conventional methods of preparation, i.e., reacting a high molecular weight glycol having the formula HO—G—OH, with phosgene. The bis-chloroformates of polyalkyleneether glycols, polyalkyleneether-thioether glycols, polyalkylene-aryleneether glycols, and polyalkylene-aryleneether-thioether glycols may conveniently be prepared by this method. The bis-chloroformates of the low molecular weight, non-polymeric glycols may also be prepared by the same general procedure. These low molecular weight glycols may be entirely aliphatic or may contain aromatic or cycloaliphatic constituents and should preferably have molecular weights of below about 200. Representative non-polymeric glycols which may be used to form the bis-chloroformates have been listed above.

The organic primary diamines which may be used to react with the bis-chloroformates to form the novel polyurethanes of the present invention may be any aliphatic, aromatic or cycloaliphatic type. Representative diamines include ethylene diamine, hexamethylene diamine, m-tolylene diamine, 4,4'-methylene diphenylamine, benzidine and 1,4-cyclohexane diamine. The diamines may have side chains containing aliphatic

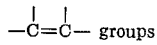 groups for example, 4-allyloxy-m-phenylene diamine may be used, which is obtained as an intermediate in the preparation of 4-allyloxy-m-phenylene diisocyanate, which is mentioned above.

In order that the polyurethanes of the present invention possess the desired elastomeric properties, they should be comprised of at least 60% by weight of the radicals obtained from the polymeric glycol reactants, either in the form of the glycol itself or that of the bis-chloroformate. In the preferred products of this invention, these polymeric radicals comprise from about 60 to 95% of the total weight of the product.

Since the polymeric polyurethanes of Adiprene C have side chains containing aliphatic

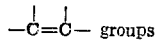 groups and these side chains serve as potential cross-linking sites, the preparation of these polyurethanes should be carried out so that on the average there is one side chain containing an aliphatic

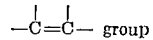 group for at least every 8000 units of molecular weight of product so that the product can be effectively cured. It is to be understood that there may be more cross linking sites present and that the number of cross linking sites present in the polymer may be in excess of the number utilized in the curing step. On the average, it is preferred to have not more than about one cross linking site per 500 units of molecular weight of polymer.

The polyurethanes may be conveniently cured by the use of a curing procedure involving the use of sulfur. In general, with this method, about 0.5 to 8 parts of sulfur per 100 parts of polymer is necessary to effect the cure in the presence of appropriate accelerators. The uncured polymeric polyurethane may be compounded with the curing agents and it is then stable and may be stored until it is desired to complete the cure, which may be accomplished by the application of heat. Curing at a temperature of about 257–320° F. for from one-half to several hours is generally sufficient. It is to be understood that various modifications of the sulfur cure may be employed, depending on the type of polyurethane used. Various procedures and modifications of sulfur curing are more particularly described in Encyclopedia of Chemical Technology, Kirk and Orthmer, published by Interscience Encyclopedia, Inc., New York, 1953, vol. 11, pages 892–927; Principles of High-Polymer Theory and Practice, Schmidt and Marlies, published by McGraw-Hill Book Company, Inc., New York, 1948, pages 556–566; and Chemistry and Technology of Rubber, Davis and Blake, published by Reinhold Publishing Corporation, New York, 1937, vol. 74, chapter VI.

E. I. du Pont de Nemours and Company, Inc., in Development Products Report No. 4, July 15, 1957, "Adiprene C a Urethane Rubber" states: "Adiprene C is a new type of urethane polymer which can be easily processed on conventional equipment. It is vulcanized with sulfur and rubber accelerators and requires reinforcing filler for best physical properties. Practical stocks containing Adiprene C show processing safety comparable to that of natural rubber or SBR stocks.

"Increasing the concentration will produce a higher state of cure—better dynamic properties, higher hardness and modulus—equivalent compression set, and somewhat poorer aging properties. Decreasing the sulfur content results in a drastically reduced state of cure."

In the "Rubber World," July 1957, W. G. Ogden discovered "Urethane Elastomers" and stated therein: "A number of urethane elastomers have been introduced utilizing various combinations within the basic reactions just described. Du Pont has under development a polyurethane elastomer, Adiprene C, which is unique in that it can be cured with sulfur and conventional accelerators. This is a radical departure from the diisocyanate curing system used with Adiprene B, Du Pont's first polyurethane elastomer.

"Adiprene C can be processed and cured with little deviation from methods common to natural rubber and SBR. Greatly improved processing, storage stability, and thermal stability are results of the change from the conventional diisocyanate curing systems.

"Adiprene C can be processed at temperatures as high as 350° F. without difficulty. This is 100° F. higher than Adiprene B can be processed. The temperature limitation for the latter is a result of the change in flow properties observed earlier. This change in flow properties indicated by the break in viscosity vs. temperature plot is observed on the mill as a rough discontinuous band."

One of the formulations which may be used comprises the polyurethane elastomer, carbon black, a plasticizer, such as tributoxy ethyl phosphate, a cure improver such as magnesium oxide, an acid such as stearic acid, an acrylonitrile rubber, and a curing agent such as dicumyl peroxide. This material may be mixed on a hot rubber mill, more particularly, in a rubber mill at approximately 300–325° F. As soon as the polyurethane elastomer is banded the stearic acid and the acrylonitrile rubber may be added and milled for approximately ten minutes with the mill rolls in the temperature range of 300–340° F. The mill is allowed to cool while running and the mixing continued for about ten minutes. The carbon black and the plasticizer are alternately added over a period of five minutes and mixed into the mixture. Then the magnesium oxide is added over a period of about one minute. Finally, the curing agent such as the dicumyl peroxide is added over a period of about one minute and the mixing continued at a temperature in the range of approximately 130–150° F. for about five minutes to form the formulation.

The formulation is then extruded into a part of the desired shape or configuration and placed in a pre-heated oven or pressure vessel at a temperature in the range of about 290–330° F. As soon as possible after being placed in this pressure vessel the part is flooded with an inert atmosphere of a fluid such as nitrogen and cured for about 30 minutes in this inert atmosphere. The pressure under which the part is cured depends upon the use to which the part is to be placed. If a solid part or a firm part is desired then the part is cured in an atmosphere of nitrogen at a pressure less than about 17 pounds per square inch absolute. If a sponge-like part is desired then the part is cured in an atmosphere of nitrogen at a pressure greater than about 17 pounds per square inch absolute.

Having presented in a general manner the teaching for curing an extruded polyurethane elastomer formulation, I now present specific examples of the same. It is to be understood that these examples are presented for illustration only and are not to be taken as limitations on the invention.

*Example I*

In this example, the results are presented in following Table I, a basic formulation comprising the polyurethane elastomer, i.e., Adiprene C, carbon black, tributoxy ethyl phosphate, magnesium oxide, and dicumyl peroxide of forty (40%) percent strength were used. To this basic formulation there were added various other components. Then the final formulation was extruded into a part and a cure of the part was attempted in an atmosphere of steam, hot air and nitrogen at a temperature in the range of about 290–330° F. The curing pressure for nitrogen was about 17 pounds per square inch absolute pressure and for steam and hot air about 80–90 pounds per square inch absolute. Turning now to Formulation A it is seen that to the basic formulation there was added stearic acid and acrylonitrile rubber. This formulation did not cure in an atmosphere of steam or in an atmosphere of hot air. However, it did cure in an atmosphere of nitrogen. The curing test was carried out in a two-fold manner. One test was to jab the extruded part with a sharp object such as a pencil point or pen. If the item was uncured the recess due to the pencil mark remained. However, if the item was cured the recess due to the pencil mark disappeared in approximately 10–15 seconds. The other facet of this test was to immerse the extruded item in a fuel comprising on a volume basis thirty (30%) percent isoctane and seventy (70%) percent toluene. If after the end of a certain time, such as four days, the surface of the extruded item was gummy or gooey it was assumed that the item was not cured. Turning now to Formulation B it is seen that in this formulation cadmium stearate was added to the basic formulation. Formulation B did not cure in an atmosphere of steam, hot air or nitrogen. Formulation C was similar to Formulation B except that the amount of dicumyl peroxide in the former was approximately thirty (30%) percent of that in the latter. Again, Formulation C did not cure in an atmosphere of steam, hot air or nitrogen. Formulations D and E were similar except that E did not have magnesium oxide. Neither of these formulations cured in an atmosphere of steam, hot air or nitrogen.

From an analysis of the experimental results in Table I it is possible to draw the conclusion that an atmosphere of steam or an atmosphere of hot air is not suitable for the curing of a polyurethane elastomer formulation. In other words, it is possible to state that the curing atmosphere should be free of free oxygen, i.e., hot air, or of oxygen containing compounds, i.e., steam. Also, it is possible to draw the tentative conclusion that such a formulation should comprise an acid such as a stearic acid and, possibly, an acrylonitrile rubber in order to cure in an inert atmosphere such as nitrogen.

TABLE I

| Component | Examples (Parts by weight) | | | | |
| --- | --- | --- | --- | --- | --- |
| | A | B | C | D | E |
| Polyalkylene ether glycol-diisocyanate elastomer | 100 | 100 | 100 | 100 | 100 |
| Carbon black | 115 | 115 | 115 | 115 | 115 |
| Tributoxy Ethyl Phosphate | 5 | 5 | 5 | 5 | 5 |
| Magnesium oxide | 10 | 10 | 10 | 10 | |
| Stearic acid | 1 | | | | |
| Butadiene-acrylonitrile rubber | 5 | | | | |
| Cadmium stearate | | 0.5 | 0.5 | | |
| Dicumyl peroxide, 40% | 5 | 10 | 3 | 5 | 5 |
| Curing Atmosphere: Temperature, 290–330° F.: | | | | | |
| Steam | No | No | No | No | No |
| Hot Air | No | No | No | No | No |
| Inert atmosphere (N$_2$) | Yes | No | No | No | No |

*Example II*

Another series of compositions of matter or formulations were prepared and cured in various atmospheres. More particularly, see following Table II. One of these formulations comprised the sulfur curing system and the other comprised the dicumyl peroxide curing system. The basic formulation comprised the polyurethane elastomer known as Adiprene C, a filler such as carbon black, acrylonitrile rubber, a plasticizer such as tributoxy ethyl phosphate, and a low temperature cure improver such as magnesium oxide. The curing operation was conducted at a temperature in the range of 290–330° F. For nitrogen the pressure was less than 17 pounds per square inch absolute, and for steam and carbon dioxide atmosphere the pressure was 80–90 pounds per square inch absolute. In Example A, the sulfur curing system was employed. The cure test was performed as explained in Example I. Example A did not cure in an atmosphere of nitrogen, steam or carbon dioxide. This indicates that the presence of oxygen or a member of the family of oxygen, i.e., sulfur, if included into the formulation as a free element or if the oxygen is in the curing atmosphere, either as free oxygen or as combined oxygen, there can be no curing of the extruded part. Turning now to Examples B through E it is seen that there was employed a dicumyl peroxide curing system. In Example B there was employed acetic acid. In Example C there was employed citric acid and in Example D there was employed stearic acid. In Examples B, C and D the extruded formulation cured in a nitrogen atmosphere, but did not cure in an atmosphere of steam or carbon dioxide. This indicates that the atmosphere must be free of oxygen in a free form, i.e., steam, or in combined form, i.e., carbon dioxide. To determine the effect of the presence of an acid there was prepared a formulation devoid of free acid, see Example E. This formulation did not cure in atmospheres of nitrogen, steam or carbon dioxide. This indicates that an acid must be present but that the type of acid present is of secondary importance.

TABLE II

| Component | Examples (Parts by weight) | | | | |
|---|---|---|---|---|---|
| | A | B | C | D | E |
| Polyalkylene ether glycol-diisocyanate elastomer | 100 | 100 | 100 | 100 | 100 |
| Carbon black | 115 | 115 | 115 | 115 | 115 |
| Mercaptobenzothiazyl disulfide | 3 | | | | |
| Mercaptobenzothiazole | 1 | | | | |
| Complex of zinc chloride and mercaptobenzothiazyl disulfide | 0.35 | | | | |
| Acrylonitrile rubber | 5 | 5 | 5 | 5 | 5 |
| Dicumyl peroxide, 40% | | 5 | 5 | 5 | 5 |
| Tributoxy ethyl phosphate | 5 | 5 | 5 | 5 | 5 |
| Magnesium oxide | 10 | 10 | 10 | 10 | 10 |
| Sulfur | 1 | | | | |
| Acetic acid (glacial) | | 1 | | | |
| Citric acid | | | 1 | | |
| Stearic acid | | | | 1 | |
| Curing atmosphere: Temperature, 290–330° F.: | | | | | |
| Nitrogen | No | Yes | Yes | Yes | No |
| Steam | No | No | No | No | No |
| Carbon less Dioxide | No | No | No | No | No |

*Example III*

Another series of formulations is prepared to determine the effect of varying the ratio of the fundamental components, i.e., polyurethane elastomer known as Adiprene C, acrylonitrile rubber, stearic acid and dicumyl peroxide and also the effect of various curing atmospheres. These formulations are cured at a temperature in the range of 290–330° F. For nitrogen and argon the curing pressure is less than about 17 pounds per square inch absolute pressure. For steam and hot air the curing pressure is about 80–90 pounds per square inch absolute. The cure tests are performed as outlined in Example I. In a nitrogen atmosphere these formulations cure but do not cure in atmospheres of steam or hot air. Also, see Example C, the formulation cured in an atmosphere of argon. Again, in the curing of these it is essential that the curing atmosphere be free of oxygen either in the combined state or in the free state. These results are summarized in following Table III.

TABLE III

| Component | Examples (Parts by weight) | | | | |
|---|---|---|---|---|---|
| | A | B | C | D | E |
| Polyalkylene ether glycol-diisocyanate elastomer | 100 | 100 | 100 | | |
| Acrylonitrile rubber | 3 | 100 | 15 | | |
| Stearic acid | 0.5 | 2 | 1 | | |
| Dicumyl peroxide, 40% | 2 | 10 | 3 | | |
| Curing atmosphere: Temperature, 290–330° F.: | | | | | |
| Steam | No | No | No | | |
| Hot air | No | No | No | | |
| Nitrogen | Yes | Yes | Yes | | |
| Argon | | | Yes | | |

In the Examples I, II and III there are presented the main components and also the secondary components. Some of the secondary components may be replaced. For example, carbon black is employed as a reinforcing agent. In its place there may be used clay, silica powder, diatomaceous earth, magnesium oxide, powdered glass and quartz.

Tributoxy ethyl phosphate is employed both as a plasticizer and to impart low temperature flexibility to the formulation. In place of the tributoxy ethyl phosphate there may be employed tricresyl phosphate, butyl oleate, engine oils, Vaseline, castor oil and petroleum to name a few.

Magnesium oxide is employed as a curve improver. It offsets the effects of a plasticizer. However, in place of the magnesium oxide there may be employed zinc oxide, calcium oxide, beryllium oxide and aluminum oxide.

In Example I, B and C, there was employed cadmium stearate. This material imparts a good finish in that a smoother extrusion and a better looking end product is realized with its use.

As a curing agent there was employed dicumyl peroxide. Normally, this curing agent comprises forty (40%) percent dicumyl peroxide and sixty (60%) percent of powdered calcium carbonate.

In addition to the dicumyl peroxide curing system there is the sulfur curing system. This curing system comprises sulfur, mercaptobenzothiazyl disulfide, mercaptobenzothiazole, and a complex of zinc chloride and mercaptobenzothiazyl disulfide.

An appropriate nitrile rubber is an emulsion copolymer of butadiene and acrylonitrile. This is more often referred as an acrylonitrile rubber. It is a rubbery material and does not soften to any great degree within a temperature range up to 250° F. It possesses high tensile strength and has desirable elongation characteristics at the breaking point and after stretching displays rapid recovery. It is resistant to abrasion, is only slightly swelled by oil, and is not appreciably deteriorated by oil.

As brought forth in Example II the presence of an acid is essential but the particular acid is of secondary importance. This example presented the use of acetic, stearic and citric acids; a relatively strong acid and weak acids. It is possible to use a strong acid such as hydrochloric acid.

Although nitrogen has been employed as the inert atmosphere it is to be realized that inert gases such as helium, argon, xenon, krypton and neon may be employed. In this regard the main requirement of the curing atmosphere is that the same be free of free oxygen or oxygen in combined form; or, a member of the sixth group of the periodic classification of the elements.

Having presented a disclosure of my invention what I claim is:

1. A process for curing an elastomeric composition of a polyurethane elastomer having side chains containing aliphatic

groups comprising adding to said elastomer butadiene-acrylonitrile rubber and a curing system consisting essentially of an acid selected from the group consisting of stearic acid, acetic acid and citric acid, and dicumyl peroxide; and curing said elastomeric composition by subjecting it to a temperature in the range of 290–330° F. in an oxygen-free atmosphere.

2. The process of claim 1 wherein the constituents of the composition of matter are present in the following proportions based on parts by weight: polyurethane elastomer, 100; butadiene-acrylonitrile rubber, 3 to 100; acid, 0.5 to 2.0 and dicumyl peroxide, 0.8 to 4.

3. The process of claim 1 wherein the polyurethane elastomer is polyalkylene ether glycol-organic diisocyanate elastomer.

4. The process of claim 2 wherein the polyurethane elastomer is polyalkylene ether glycol-organic diisocyanate elastomer.

5. The process of claim 1 wherein the acid is stearic acid.

6. The process of claim 1 wherein the acid is acetic acid.

7. The process of claim 1 wherein the acid is citric acid.

8. A process according to claim 1 wherein the oxygen-free atmosphere is nitrogen.

References Cited by the Examiner

UNITED STATES PATENTS 2,808,391   10/1957   Pattison _____ 260—77.5
2,853,472   9/1958    Schroeder et al. _____ 260—2.5

OTHER REFERENCES

Chem. & Eng. News, vol. 33, No. 20, May 16, 1955, page 2079.

SAMUEL H. BLECH, *Primary Examiner.*

WILLIAM H. SHORT, MURRAY TILLMAN,
*Examiners.*

N. W. SHUST, E. J. TROJNAR, *Assistant Examiners.*